(12) United States Patent
Narasimhamurthy

(10) Patent No.: US 11,578,280 B2
(45) Date of Patent: Feb. 14, 2023

(54) METHOD FOR THE TREATMENT OF GRANULATED LIQUID SLAG IN A HORIZONTAL FURNACE

(71) Applicant: Prakashkumar Narasimhamurthy, London (GB)

(72) Inventor: Prakashkumar Narasimhamurthy, London (GB)

( * ) Notice: Subject to any disclaimer, the term of this patent is extended or adjusted under 35 U.S.C. 154(b) by 337 days.

(21) Appl. No.: 16/651,415

(22) PCT Filed: Oct. 8, 2018

(86) PCT No.: PCT/IB2018/057782
§ 371 (c)(1),
(2) Date: Mar. 27, 2020

(87) PCT Pub. No.: WO2019/069294
PCT Pub. Date: Apr. 11, 2019

(65) Prior Publication Data
US 2020/0291313 A1 Sep. 17, 2020

(30) Foreign Application Priority Data
Oct. 7, 2017 (GB) .................................. 1716444

(51) Int. Cl.
*C10J 3/00* (2006.01)
*C10J 3/57* (2006.01)
(52) U.S. Cl.
CPC ................. *C10J 3/002* (2013.01); *C10J 3/57* (2013.01); *C10J 2200/09* (2013.01); *C10J 2200/152* (2013.01); *C10J 2300/0946* (2013.01); *C10J 2300/0956* (2013.01); *C10J 2300/0986* (2013.01); *C10J 2300/1238* (2013.01); *C10J 2300/1628* (2013.01)

(58) Field of Classification Search
CPC .............. C10J 3/002; C10J 3/40; C10B 49/04
See application file for complete search history.

(56) References Cited
U.S. PATENT DOCUMENTS

| 1,814,463 | A | * | 7/1931 | Trent | ......................... | C10B 7/06 |
| | | | | | | 201/26 |
| 1,839,741 | A | * | 1/1932 | Davies, Jr. | ................ | F23B 5/02 |
| | | | | | | 48/209 |
| 2,581,575 | A | * | 1/1952 | Broadman | ............... | C10J 3/002 |
| | | | | | | 48/78 |

(Continued)

Primary Examiner — Imran Akram

(57) ABSTRACT

Improvements to the gasifier furnace design and process method to facilitate continuous production of mainly $H_2$, CO and granulated solid from molten liquid or the liquid slag in the presence of carbonaceous material. It is a method of quenching molten liquid and cooling post quenched hot granulated solid which is done within a long horizontal reaction chamber space of the furnace in the presence of C and $H_2O$. A moving layer of continuously gas cooled granulated solid protects the moving floor underneath by substantially reducing the possibility of heat transfer from the horizontal reaction chamber to such moving floor and its parts and preventing direct contact between the post quenched hot solid granulates and such moving floor. Such moving floor having plurality of gas passages and is disposed above a plenum that receives gas from outside source and uniformly distributes the gas to pass through all the gas passages.

1 Claim, 1 Drawing Sheet

(56) References Cited

U.S. PATENT DOCUMENTS

| | | | | |
|---|---|---|---|---|
| 2,751,287 | A * | 6/1956 | Donath | C10J 3/40 |
| | | | | 48/197 R |
| 3,226,212 | A * | 12/1965 | Ban | C10J 3/06 |
| | | | | 202/117 |
| 3,787,192 | A * | 1/1974 | Ban | C10J 3/84 |
| | | | | 48/210 |
| 4,156,595 | A * | 5/1979 | Scott | C10B 53/08 |
| | | | | 44/577 |
| 4,231,304 | A * | 11/1980 | Hoskinson | F23G 5/00 |
| | | | | 110/259 |
| 6,381,963 | B1 * | 5/2002 | Graham | F23L 13/00 |
| | | | | 60/645 |
| 2005/0098072 | A1 * | 5/2005 | Mooney | F23G 5/14 |
| | | | | 110/101 CD |
| 2007/0266634 | A1 * | 11/2007 | Tsangaris | C10J 3/48 |
| | | | | 48/119 |
| 2015/0129178 | A1 * | 5/2015 | Bell | F28C 3/06 |
| | | | | 165/104.31 |
| 2015/0232771 | A1 * | 8/2015 | Bell | C10J 3/721 |
| | | | | 422/618 |

* cited by examiner

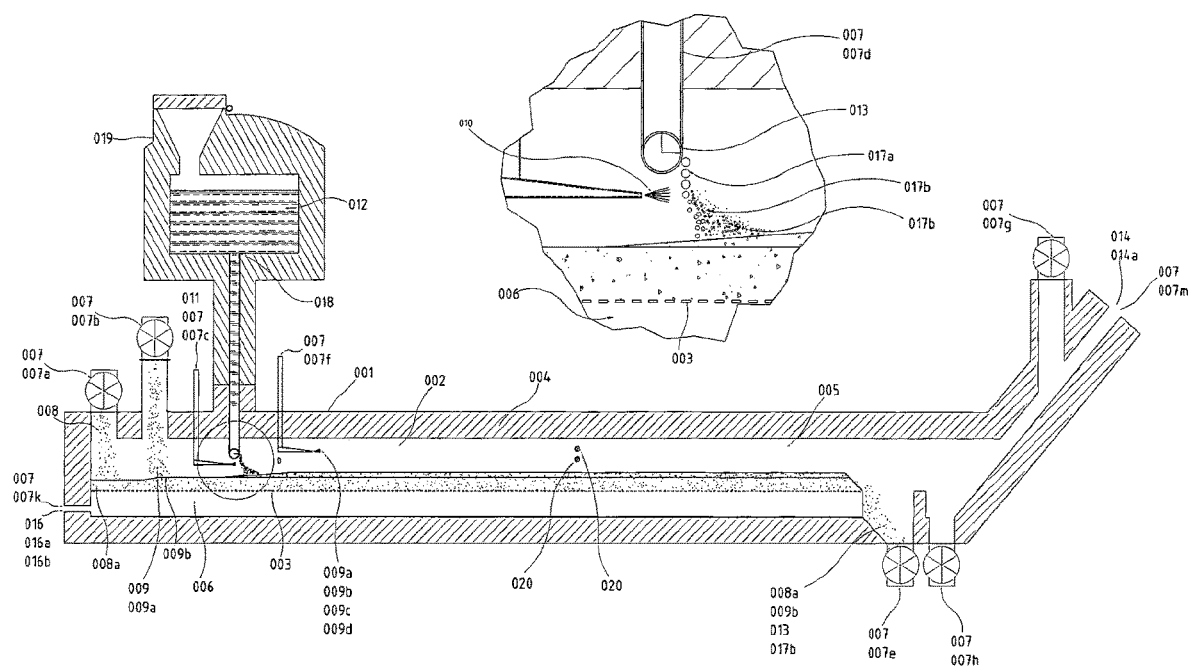

METHOD FOR THE TREATMENT OF GRANULATED LIQUID SLAG IN A HORIZONTAL FURNACE

BACKGROUND OF THE INVENTION

Field of the Invention

This invention relates to a collective set of improvements made to a molten slag quenching reactor chamber of a furnace and a system to facilitate continuous quenching of the molten slag, the process method and the operating steps employed in the reactor chamber of such a furnace is collectively referred to as preferred embodiment.

Myriad economic and environment benefits have been reported if $H_2$ and CO were to be produced from renewable sources. In the power and the steel industries there is a global drive for innovation, research and development for renewable production of $H_2$ and CO fuel by exploiting the enormous thermal energy contained in the molten slag which is otherwise wasted. However, unlocking the full potential thermal energy contained in the molten slag and its efficient use for such purposes has remained an engineering challenge.

Description of the Related Art

The purpose of thermo-chemical conversion of reactants such as carbonaceous material and water ($H_2O$ liquid or gas) into hydrogen ($H_2$) and carbon monoxide (CO) from quenching molten slag in a reactor chamber is a prior art[7]. Molten slag providing the required heat and behaving as a catalyst to initiate such thermo-chemical reaction is an established knowledge. Production of $H_2$ using iron (Fe) contained especially in the molten steel and in the molten steel slag which would absorb the oxygen from steam ($H_2O$ gas) giving only $H_2$ is a prior art[6]. Preventing an oxyhydrogen explosion during quenching especially (Fe) bearing molten slag is a prior art[8]. Reducing carbon dioxide ($CO_2$) into CO in the presence of carbonaceous material and molten slag is a prior art[7]. Thermal cracking of the hydrocarbon for example, methane ($CH_4$) into $H_2$, CO and C in the presence of molten slag is a prior art[7]. Varying reactants and their respective mass input to achieve higher concentration of $H_2$ in the thermo-chemically formed product gas without requiring Water Gas Shift (WGS) is a prior art[2]. Subsequent conversion of CO produced in the presence of molten slag into $H_2$ and $CO_2$ in a Water Gas Shift (WGS) process is an established knowledge. Supportive auxiliary method and equipment for example Membrane, Pressure Swing Adsorption and Amine Solution separation of $H_2$ from $CO_2$, CO and other gasses is an established knowledge. Recovering thermal energy (sensible heat) from quenching molten slag is a prior art[7]. Producing granulated fertilizer slag especially from quenching molten steel slag and making good use of the phosphorous, silicates and calcium contained in it for soil conditioning and as a fertilizer is a prior art[9]. High temperature Methane Decarburization (MDC) is more process efficient than the Steam Methane Reformer (SMR) process and does not produce $CO_2$'. Various prior art reactor chamber designs, process methods and operating steps supported by auxiliary method and equipment have been employed to achieve such purposes with or without using the heat from molten slag in a batch type or continuous type process.

U.S. Pat. No. 7,914,765 by McLean et al relates to continuously producing higher concentration of hydrogen in the finally formed product gas from the steam oxidation of molten iron (not from the molten slag) in multiple reactor chambers. Each such furnace chamber disposed to conduct separate reaction but are connected to work as one unit for a continuous type process. The article in 2015 Energies publication by Y Sun et al, summarizes a few prior art reactor chambers, methods and steps to produce $H_2$, CO, granulated slag and recover thermal energy from quenching molten slag.

Learning from the relevant prior arts and established knowledge, there is scope to improve the operational and heat recovery efficiencies in a reactor chamber of a furnace used to quench molten slag. There is scope to improve the operational safety and flexibility to operate with various combinations and various compositions of available reactant materials using all types of carbonaceous materials and catalyst materials in reactor chamber. It is essential to maximize the concentration of $H_2$ and CO in the produced gas stream as well as maintain consistency in its output. There is a need to make optimum use of carbonaceous waste, low rank coal and flux materials. The process should be continuous by facilitating continuous quenching of the molten slag within the reactor chamber and made feasible for industrial scale production. The process can be made more sustainable by improving the quality of the granulated slag, more particularly granulated slag fertilizer made of porous slag granulates. Such granulated slag fertilizer would contain Nitrogen, Phosphorous, Potassium (NPK) composition in addition to other supporting minerals as required and preferred by the market. Producing such quality $H_2$, CO and granulated slag or granulated slag fertilizer and maximizing thermal energy recovery would improve the sustainability and value to the process of quenching the molten slag.

SUMMARY OF THE INVENTION

The main objectives of the preferred embodiment are to:

improve efficiencies in the operation, thermo-chemical reaction, process control, thermal energy recovery, and to improve operational safety during the production of $H_2$, CO and granulated slag or granulated slag fertilizer from the molten slag, recover thermal energy from quenching the molten slag and subsequently from cooling the post quenched hot granulated solid slag within the preferred embodiment's reactor chamber, provide flexibility to introduce various combinations and various compositions of available reactant, carbonaceous, flux and catalyst materials into the reactor chamber and achieve the optimum possible quality and quantity production of $H_2$ and CO from all the inputs, facilitate the three main stages of thermo-chemical reactions within the preferred embodiment such as: first stage of thermo-chemical reaction between the fragments of molten slag and the reactant quenchant, second stage of thermo-chemical reaction between the post quenched hot granulated solid slag and a reactant gas and the third stage of thermo-chemical reaction between the respective gases generated during the first and second stages of thermo-chemical reactions. The purpose of the three main stages of thermo-chemical reactions made to occur within the reactor chamber at temperatures around 800° C. is to achieve a higher concentration of $H_2$ or CO in the produced gas stream. After the third stage thermo-chemical reaction, the produced gas stream may be further subjected to a lower temperature (<800° C.) thermo-chemical reaction within the reactor chamber by exposing the exiting gas stream to catalyst or flux or carbonaceous material or to a mixture of flux and carbonaceous material. This would achieve the intended $H_2$:CO ratio or would achieve maximum possible concentration of either $H_2$ or CO or of their mixture in the finally formed product gas while simultaneously maximizing net thermal energy recovery from the molten slag for this purpose, facilitate continuous production of $H_2$, CO, granulated slag and recovery of thermal energy from facilitating continuous quenching of the molten slag in the reactor chamber, protect the inside of the reactor chamber from the influence of the outside atmosphere and prevent any unwanted air contamination within the reactor chamber during the production of $H_2$ and CO from quenching molten slag, protect the reactor chamber movable floor and the parts below such a movable floor from the heat caused by radiation, convection and conduction in the reactor chamber. This is to improve the operational efficiency and availability of the reactor chamber as well as, to generally improve the operational safety during the production of $H_2$ and CO from quenching molten slag, to use externally cleaned and cooled industrial flue exhaust as a reactant gas and convert $CO_2$, $O_2$ and small amount of $H_2O$ in the form of water vapour present in such flue exhaust into $H_2$ and CO fuel, thereby sequestering $CO_2$ from the industrial flue exhaust, to optionally use atmosphere air as a reactant gas and convert $CO_2$, $O_2$ and the small amount of $H_2O$ present in the atmosphere air into $H_2$ and CO fuel, and to optionally process the molten slag in the reservoir and alter its mineral composition to enhance the thermo-chemical reactions and to produce granulated slag fertilizer of required mineral composition.

The preferred embodiment set-up increases the surface area interface between all the inputs, increases the residence time for the reactants to react within the reactor chamber, improves the efficiency of unlocking thermal energy contained in the molten slag, improves the efficiency of recovering the unlocked thermal energy and improves the efficiency in using such recovered thermal energy to produce $H_2$ and CO from using various reactants and catalyst materials. Such reactants are water, carbonaceous and flux materials, $CO_2$ and $O_2$ that initiate thermo-chemical reactions under intense heat and reduce atmospheric conditions in the reactor chamber to produce $H_2$ and CO. Such reactants are introduced into the reactor chamber in gaseous, liquid and powdered solid forms or as their mixtures. Granulated carbonaceous material and fluxes can also be introduced into the reactor chamber. Catalyst materials may be introduced in their pellet form.

The preferred embodiment facilitates continuous production of $H_2$, CO, granulated slag or granulated fertilizer slag and recovery of thermal energy resulting from continuous quenching of molten slag within the reactor chamber.

The preferred embodiment:

allows the feeding of the solid, liquid and gas material into the reactor chamber and the removal of gas and solid material through furnace inlet and outlet openings which are provided by means to prevent unwarranted entry of the outside atmospheric air into the reactor chamber and to allow exit of gas from inside the reactor chamber from its designated outlet opening.

allows to make variation to the flow, volume and mass of all inputs into the reactor chamber, is flexible to take varied compositions of reactants, and would have adjustable speed to move the solid materials forward towards the outlet that removes the mixture of hot solid materials from the reactor chamber.

The preferred embodiment results in efficient thermal energy recovery from quenching molten slag and from subsequent cooling of the post quenched hot granulated slag. The recovered thermal energy initiates and supports the endothermic thermo-chemical reactions. The remaining recovered energy is in the form of sensible heat contained in the finally formed hot product gas stream comprising mainly $H_2$, CO and the sensible heat in the mixture of hot solid materials exiting the reactor chamber.

In the preferred embodiment, a large surface area interface between the molten slag and the reactant occur when the molten slag is fragmented, and such fragments are exposed to the mist spray of reactant in an open space within the reactor chamber.

In the preferred embodiment, a large surface area interface between the floored layer of the post quenched hot granulated solid slag and floored layer of carbonaceous material or the mixture of carbonaceous and flux materials occur throughout the length and width of the movable floor. This is caused by even spreading of such layers across the width and from the regular forward movement of each such layer in the reactor chamber.

In the preferred embodiment, a large surface area interface occurs between all the layers of material above the movable floor having plurality gas injecting passages and the reactant gas injected into the plenum. This is due to the plenum and the movable floor having plurality gas injecting passages which are engineered to evenly distribute the reactant gas injected into the plenum throughout the width and length under such movable floor. Such evenly distributed reactant gas passes through plurality of gas injecting passages disposed throughout the width and the length of the movable floor into all the layers of solid materials above the movable floor as an upward draft. This results in a large surface area interface between the upward draft reactant gas, reactant solid materials and the hot solid granulated slag. The movable floor with plurality gas injecting passages would prevent dust particles from above falling through into the plenum.

In the preferred embodiment, a large surface area intersection occurs in the reactor chamber space between the hot horizontal draft gas and hot upward draft gas. The hot horizontal draft gas is generated in the first stage of thermo-chemical reaction during quenching molten slag with reactant. The hot upward draft gas is generated in the second stage thermo-chemical reaction occurring between the reactant gas and the hot mixture layer of solid granulated slag and carbonaceous material or the mixture of carbonaceous and flux materials throughout most of the width and length of the movable floor.

The hot gas generated during the first and second stage thermo-chemical reactions, the heat radiated from quenching molten slag in the reactor chamber space, the heat radiated from the hot mixture layer of solid granulated slag and carbonaceous material or the mixture of carbonaceous and flux material would intensely radiate heat within the insulated walls and the insulated ceiling covering the space above the movable hot mixture layer of solid granulated slag in the horizontal reactor chamber.

By controlling the flow of carbonaceous material and constantly maintaining the heat would constantly maintain the horizontal reactor chamber space under very hot reducing atmospheric condition.

Combination of intense heat radiation maintained under reducing atmosphere condition initiate the third stage thermo-chemical reaction between the intersecting hot horizontal and hot upward draft gas in the reactor chamber space.

The third stage thermo-chemical reaction increases the concentration of $H_2$ and CO in the gas stream which would already contain $H_2$ and CO generated in the first and second stage thermo-chemical reactions, Thus, making it possible to continuously generate optimum producible quality and quantity of $H_2$ and CO from all the inputs.

Cleaned and cooled industrial flue exhaust containing $CO_2$, $O_2$ and $H_2O$ in small amounts as water vapour is used as reactant gas and injected into the plenum. The plenum supports the base of the movable floor having plurality reactant gas injecting passages. The cooler reactant gas injected into the plenum is subsequently converted into a uniformly distributed upward draft reactant gas. The upward draft reactant gas first passes through the plurality gas injecting passages in the movable floor. Then it passes through a layer of externally cooled ambient temperature granulated slag which is primarily introduced into the reactor chamber. The cold layer of granulated slag forms a barrier between the movable floor and the hot layer of granulated slag mixed with carbonaceous material or the mixture of carbonaceous and flux materials. This method of upward draft injection of cooler reactant gas into a layer of cold granulated slag prevents the radiation, convection and conduction of the intense heat from the hot layer of granulated slag mixed with carbonaceous material reaching the movable floor, plenum and their parts. This would protect the movable floor, plenum and their parts from the heat, maintain their structural strength, stability, durability and prevent the need for unplanned repair and maintenance.

The hot layer mixture of granulated slag and carbonaceous material or the mixture of carbonaceous and flux materials, the intense radiated heat above 800° C. and the reducing atmosphere maintained in the reactor chamber would convert most or all the $CO_2$, $O_2$ and $H_2O$ present in the reactor chamber space into $H_2$ and CO fuel.

Pollutants in an industrial flue exhaust are removed by externally cleaning and cooling such flue exhaust before injecting it into the plenum. Further, the $CO_2$ present in such flue exhaust is suppressed. Therefore, the preferred embodiment system and method may be considered as delivering almost "zero pollution" from an industrial process from where such flue exhaust originates, Similarly, ambient air may also be used as reactant gas to covert the $CO_2$, $O_2$ and the small amount of $H_2O$ in the form of water vapour present in air into $H_2$ and CO fuel.

In the preferred embodiment, the methods and the steps result in rapid quenching of the molten slag fragments followed by gradual cooling of the post quenched hot granulated slag. The rapid quenching of the fragments would potentially produce porous hot granulated slag. The porous hot granulated slag is understood to act as a catalyst. This would improve the thermo-chemical reactions during the second and third stages caused by its interaction with carbonaceous material, flux and upward draft reactant gas. The surface of the porous hot granulated slag layer would behave like a catalyst floor base and would potentially improve the third stage thermo-chemical reaction between the intersecting hot horizontal draft gas and the hot upward draft gas in the reactor chamber space. Gradual cooling of the post quenched hot solid porous slag granulates would maintain or improve the porosity.

The porous granulated slag after subsequent cooling to ambient temperature is economical and easier to grind and if used as a granulated slag fertilizer would improve the soil and crop growing conditions.

Storing and processing the molten slag to after its mineral composition would potentially produce granulated slag fertilizer with required mineral compositions.

To store molten slag to facilitate continuous quenching and to facilitate processing before quenching, a molten slag reservoir is disposed external to the preferred embodiment's furnace and the reservoir's outlet is connected to the reactor chamber inlet of the furnace.

The molten slag produced and wasted in the slagging furnace is intermittently transported normally in a hot pot carrying molten slag and poured into such a reservoir. This facilitates storing a larger quantity of molten slag from the intermittent supplies of smaller quantity in hot pots. Such stored molten slag can be continuously introduced into the reactor chamber to facilitate its continuous quenching and to continuously produce $H_2$, CO and granulated slag or granulated slag fertilizer. Also, this would facilitate continuous suppressing of the $CO_2$ present in an industrial flue exhaust.

Thermo-chemical reactions may be further improved by exposing the gas stream after the third stage of thermo-chemical reaction to catalyst pellets or flux or carbonaceous material or a mixture of carbonaceous material and flux. Such materials can be continuously or intermittently introduced and removed from the reactor chamber.

Thermo-chemical reactions may be improved by using operational plasma electrodes or heat delivery torches or similar means in the reactor chamber space.

The industrial installation of the preferred embodiment would replace the slag pit and receive the molten slag from a slagging furnace such as Blast Furnace, Basic Oxygen Furnace, Electric Arc Furnace, Entrained-Flow Gasifier etc. that produce molten slag. This will benefit molten metal processing industries such as steel plants, molten slag producing Integrated Gasification of Coal and Combustion (IGCC) Power Generation Plants and any other types of industries that produce molten slag.

Scaling up the preferred embodiment's reactor chamber to meet a required production output capacity is possible from extending especially the length of the horizontal furnace and the corresponding length of the reactor chamber space. Multiples of such units can be connected to work as one unit.

Composition of the reactant quenchant used to quench the fragments of molten slag and the composition of the reactant gas used as upward draft may contain cleaned and cooled: flue exhaust of an industrial plant combustion process; exhaust of a hydrogen producing Water Gas Shift process; exhaust of a syngas producing methane reformer etc. Thus, the preferred embodiment may be considered more feasible, acceptable and beneficial than the Carbon Capture and Storage under the sea or an ocean bed (CCS) system and method.

When combining and integrating either a molten slag producing plant such as a steel plant or an IGCC Power Generation plant etc. with a Shale gas producing site, it is potentially possible to directly convert the raw shale gas into purified syngas of mainly $H_2$ and CO in the preferred embodiment delivering substantial savings and environmental benefits. Similarly, by combining with a petrochemical industry, it is potentially possible to directly convert low grade fossil fuels which are normally flared up at the stack exit of a petrochemical industry, into purified syngas in the preferred embodiment delivering substantial savings and environmental benefits.

In all scenarios, there is a potential to convert carbonaceous material such as contaminated waste oil, municipal waste, sludge etc into valuable $H_2$ and CO fuel, Thus, solving environmental issues and the costs associated with disposal of such waste. Also, the environmental damage arising from burning such waste and low rank coal to generate energy would be prevented. Gasification of cheaper and abundantly available waste, low rank coal and generating clean power would significantly reduce the cost of electricity generation. Suppressing $CO_2$ would potentially result in better than neutral or at least neutral carbon emissions from combusting carbonaceous material.

DESCRIPTION OF THE DRAWING

FIG. 1 is a schematic cross section of the preferred embodiment comprising horizontal furnace (001) with a corresponding horizontal reactor chamber space (002) which is internally surrounded in the base mostly by movable floor disposed with plurality reactant gas injecting passages herein referred to as movable floor (003), insulated ceiling (004) and insulated walls (005) comprising:

a plenum (006) to support the movable floor from below and to inject externally cleaned and cooled industrial flue exhaust (016) or air (016a) or their combination thereof (016b) into the reactor chamber space via inlet (007k), means (007) to prevent outside atmosphere air entering the reactor chamber from any inlet and outlet in the furnace other than through the plenum inlet (007k), Inlet (007a) to introduce a layer of externally cooled ambient granulated solid slag herein referred to as cold slag (008) or any other similar type of material, into the reactor chamber and spread across the width of the movable floor, inlet (007b) to introduce a layer of the carbonaceous material (009) or a mixture of carbonaceous material and flux material (009a) into the reactor chamber and spread above and across the layer width of the cold slag, inlet (007c) to introduce reactant (011) into the reactor chamber and spray (010) the reactant, inlet (007d) to introduce molten slag (012) into the reactor chamber space and a means to divide the molten slag stream into smaller streams and fragment (013) the smaller stream of molten slag by spraying reactant across the falling small stream, outlet (007e) to remove the mixture of hot solid materials (013) from the reactor chamber and such outlet located after the movable floor, outlet (007m) to remove the produced hot gas stream (014) from the reactor chamber, wherein the method and steps to produce hot gas stream (014) containing mainly $H_2$, CO (014a) and hot mixture of solid materials (013) containing mainly granulated slag (008a, 017b) comprising;

switching on the movable floor to move forward towards the outlet (007e) to remove the mixture of hot solid materials (013), injecting the reactant gas (016, 016a, 016b) into the plenum via inlet (007k), introducing the cold granulated slag into the reactor and continuing until such layer of the cold granulated slag (008a) covers the width and length of the movable floor and begin to exit the reactor chamber from the outlet (007e), introducing the carbonaceous material (009) or the mixture of carbonaceous and flux materials (009a) into the reactor chamber until such layer (009b) covers the width and length of the cold slag layer (008a) and begin to exit the reactor chamber from the outlet (007e), simultaneously introducing the reactant and the molten slag into the reactor chamber, divide the received molten slag into plurality of thinner streams, make them fall by gravity while spraying the reactant (010) onto the falling thinner stream and fragment thinner stream molten slag (017a) in the reactor chamber space to produce hot granulated solid slag (017b) and receiving the produced hot stream of gas (014) containing mainly $H_2$ and CO (014a), hot mixture of solid materials containing mainly layer of cold slag (008a), layer of hot granulated solid slag (017b) and the layer of formed residue from the layer of carbonaceous material (009a) or the layer of the mixed carbonaceous and flux material (009b) for further downstream processing.

The molten slag inlet (007d) of the reactor chamber connected to an outlet (018) of an externally located molten slag reservoir (019).

Inlet (007f) to introduce gaseous or liquid or powdered solid carbonaceous material or their mixture thereof (009a, 009b, 009c, 009d) after the molten slag inlet (007d). The reactor chamber in between the inlet (007d) and the outlet (007e) is considered as reactor chamber space (002) wherein all thereto-chemical reactions occur.

The first, second and third stage thermo-chemical reactions would occur above 800° C. throughout the reactor chamber space (002). This is based on Boudouard reaction and Ellingham drawing". It states the formation free energy of carbon dioxide (CO2) is almost independent of temperature, while that of carbon monoxide (CO) has negative slope and crosses the $CO_2$ line near 700° C. According to the Boudouard reaction, carbon monoxide is the dominant oxide of carbon at higher temperatures (above about 700° C.), and the higher the temperature (above 700° C.) the more effective a reductant (reducing agent) carbon."

Inlet (007g) to introduce and outlet (007h) to remove catalyst pellets or flux or carbonaceous material or the mixture of carbonaceous and flux material from the reactor chamber section are disposed after the reactor chamber space outlet (007e). This purpose is to expose the produced hot gas after the third stage thermo-chemical reaction to catalyst pellets or flux or carbonaceous material or the mixture of carbonaceous and flux material. This would potentially generate a hot gas stream with maximum possible concentration of either $H_2$ or CO or their mixture with required $H_2$:CO ratio from all the inputs. This would result from the thermo-chemical reactions occurring below 800° C. for example as in a Water Gas Shift process.

Operational plasma electrodes and heat delivery torches or similar means (020) are disposed in the reactor chamber space to enhance the thermo-chemical reactions.

The preferred embodiment can further purify the produced hot $H_2$+CO or covert any remaining hot $CO_2$ contained in such gas streams into CO. For this purpose, the hot gas is made to flow as downdraft through a bed of solid granulated carbonaceous material which is moved by the moving floor having plurality of gas passages. Alternatively, a layer of carbonaceous material is spread over a cold layer of moving granulated solid material. The hot $CO_2$ gas react with carbonaceous material to produce CO and simultaneously get cooled during the process. The cooled gas is collected from the plenum underneath and is drawn outside the furnace from the exits located in the bottom of the plenum. In this case, there can be plurality of exits fitted with mechanical blowers and such exits distributed evenly across the length and width of the plenum bottom. This arrangement would facilitate the cooled gas being uniformly sucked into the plenum throughout the underneath of the moving floor having plurality gas passages.

REFERENCES

1. Experimental analysis of direct thermal methane cracking, 2011, A Abánades "Methane decarburation (MDC) is more energy effective than Steam Methane Reforming (SMR) and do not produce $C_2$".
2. A steam process for coal gasification, 1979, S. L. Soo et al, R. T. Gibbs et al "A high percentage of $H_2$ can be produced in the product gas without the need for shift conversion".
3. US20040265651, 2004, Meyer Steinberg et al "In the method of the invention, five technologies, known in the art, are combined in a single integrated process".
4. U.S. Pat. No. 4,772,775, 1988, Sam L. Leach et al "Electrodes may initially form the arc plasma in air or other gas".
5. U.S. Pat. No. 2,678,956, 1950, Hasche Rudolph Leonard et al "In high temperature thermal cracking, $CH_4$ does more than reduce the partial pressure but also appears to function as an active agent".
6. U.S. Pat. No. 7,914,765, 2008, Leslie C. McLean et al "continuously producing higher concentration of hydrogen in the finally formed product gas from the steam oxidation of molten iron (not from the molten slag) in multiple reactor chambers".
7. Heat recovery from high temperature slags, Energies 2015, Y. Sun et al.
8. U.S. Pat. No. 6,196,479, 1999, Alfred Edlinger et al "Method and device for granulating and comminution of liquid slags and preventing oxyhydrogen explosion during quenching metal bearing molten slag with water".
9. U.S. Pat. No. 3,298,822, 1967, William J Arvay et al "Method of making slag-based soil treatment composition comprising plant available phosphorus values".
10. https://en.wikipedia.org/wiki/Ellingham_diagram

The invention claimed is:

1. A method of recovering thermal energy from a molten slag in a horizontal furnace with a moveable floor comprising:
   spreading a cold slag across length and breadth of the moveable floor to form a first layer on the moveable floor;
   spreading a carbonaceous material on top of the first layer to form a second layer;
   introducing the molten slag into the furnace and dividing the molten slag into smaller streams;
   spraying a quenchant to perform combined actions of fragmenting the smaller streams of the molten slag into a granulated solid slag and quenching the granulated solid slag to generate a horizontal draft gas;
   spreading the granulated solid slag over the second layer to form a third layer; and
   injecting a reactant gas from below the movable floor to create a upward draft reactant gas by the reactant gas reacting with the first, second and third layer;
   wherein the horizontal draft gas and the upward draft gas combine to increase residence time of the gases in the horizontal furnace for higher recovery of thermal energy from the molten slag.

* * * * *